(12) United States Patent
Roy et al.

(10) Patent No.: US 7,903,583 B2
(45) Date of Patent: Mar. 8, 2011

(54) UNSYNCHRONIZED ADJACENCIES IN OSPF

(75) Inventors: Abhay Roy, Santa Clara, CA (US); Alfred C. Lindem, III, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1061 days.

(21) Appl. No.: 11/179,126

(22) Filed: Jul. 11, 2005

(65) Prior Publication Data

US 2007/0019647 A1 Jan. 25, 2007

(51) Int. Cl.
*H04L 12/28* (2006.01)
(52) U.S. Cl. .......................... 370/255; 714/18
(58) Field of Classification Search ............ 714/18, 714/39, 43; 370/218, 227, 255
See application file for complete search history.

(56) References Cited

U.S. PATENT DOCUMENTS

| | | | | |
|---|---|---|---|---|
| 6,295,541 B1 * | 9/2001 | Bodnar et al. | .............. | 707/203 |
| 6,418,476 B1 * | 7/2002 | Luciani | .............. | 709/238 |
| 6,590,868 B2 * | 7/2003 | Shen | .............. | 370/242 |
| 6,721,899 B1 * | 4/2004 | Narvaez-Guarnieri et al. | .. | 714/4 |
| 7,366,099 B2 * | 4/2008 | Shand | .............. | 370/235 |
| 2004/0139235 A1 * | 7/2004 | Rashid et al. | .............. | 709/248 |
| 2006/0166689 A1 * | 7/2006 | Phillips | .............. | 455/502 |
| 2006/0198346 A1 * | 9/2006 | Liu et al. | .............. | 370/338 |

OTHER PUBLICATIONS

J. Moy, "OSPF Version 2," RFC 2328, Network Working Group, pp. 1-187, Apr. 1998.

* cited by examiner

*Primary Examiner* — Dang T Ton
*Assistant Examiner* — Wei Zhao
(74) *Attorney, Agent, or Firm* — Cesari and Mckenna, LLP

(57) ABSTRACT

A method and apparatus for managing network communication that operate on the idea that if a new neighboring node is already reachable as represented in a shortest path data structure that the local node consults, there is no urgency in doing a full database synchronization between the local node and the neighboring node. The present invention delays database synchronization as long as possible to reduce unnecessary OSPF packets traversing communication links between nodes of the network. Since unsynchronized neighbors remain in 2-way state, OSPF updates are not flooded over the corresponding interfaces.

20 Claims, 3 Drawing Sheets

UNSYNCHRONIZED ADJACENCIES IN OSPF

FIELD

The present invention relates broadly to computer networks employing routers that communicate link-state information to each other. Specifically, the present invention relates to elimination of unnecessary traffic in the form of database description, link-state requests and link state update packets.

BACKGROUND OF THE INVENTION

Open Shortest Path First (OSPF) is a routing protocol developed for Internet Protocol (IP) networks. OSPF is a link-state routing protocol that calls for the sending of link-state advertisements (LSAs) to all other routers within the same hierarchical area. Information on attached interfaces, metrics used, and other variables, is included in OSPF LSAs. As OSPF routers accumulate link-state information, they use algorithms that calculate the shortest path to various routers (network nodes). The largest entity within the hierarchy is an autonomous system (AS), which is a collection of networks under a common administration that share a common routing strategy. OSPF is an intra-AS (interior gateway) routing protocol, although it is capable of receiving routes from and sending routes to other ASs. An AS can be divided into a number of areas, which are groups of contiguous networks and attached hosts. Routers with multiple interfaces can participate in multiple areas. These routers, which are called Area Border Routers, maintain separate topological databases for each area. A topological database is essentially an overall picture of networks in relationship to routers. The topological database contains the collection of LSAs received from all routers in the same area. Because routers within the same area share the same information, they have identical topological databases.

The Shortest Path First (SPF) routing algorithm is the basis for OSPF operations. When a router using the SPF algorithm is powered up, it initializes its routing-protocol data structures and then waits for indications from lower-layer protocols that its interfaces are functional. After a router is assured that its interfaces are functioning, it uses the OSPF Hello protocol to acquire neighbors, which are routers with interfaces to a common network. The router sends hello packets to its neighbors and receives their hello packets. In addition to helping acquire neighbors, hello packets also act as "keepalives," messages that let routers know that other routers are still functional. On multi-access networks (networks supporting more than two routers), the Hello protocol elects a designated router and a backup designated router. Among other things, the designated router is responsible for generating LSAs for the entire multi-access network. Designated routers allow a reduction in network traffic and in the size of the topological database.

When the topological databases of two neighboring routers are synchronized, the routers are said to be adjacent. Adjacencies control the distribution of routing-protocol packets, which are sent and received only on adjacencies. Each router periodically sends its LSAs to provide information on a router's adjacencies or to inform others when a router's state changes. By comparing established adjacencies to link states, failed routers can be detected quickly, and the network's topology can be altered appropriately. From the topological database generated from LSAs, each router calculates a shortest-path tree (SPT), with itself as root. The SPT, in turn, yields a routing table.

In Mobile Ad-hoc Networks (MANET), there are highly-meshed connections. Due to prohibitive overhead costs of maintaining many peerings, it is not always desirable to bring up routing peering with all possible visible neighbors. But this results in lost, potentially-usable forwarding paths. There is a need for a solution that does not have to perform a full database exchange, but at the same time assumes the adjacency is synchronized and announces the corresponding link for transit. This would reduce peering overhead, and the many alternate paths could be used, thus more effectively utilizing available network throughput. In the case of OSPF, the use of many alternate paths translates into the ability to announce and use the adjacency (for data plane) without incurring the expense of a full database exchange or handling flooding updates over this adjacency.

SUMMARY OF THE INVENTION

The present invention solves the problems described above by implementing a method and apparatus that operate on the idea that if a new neighboring node is already reachable as represented in a shortest path data structure that the local node consults, there is no urgency in doing a full database synchronization between the local node and the neighboring node. The present invention delays database synchronization as long as possible to reduce unnecessary OSPF packets traversing communication links between nodes of the network. Since unsynchronized neighbors remain in 2-way state, OSPF updates are not flooded over the corresponding interfaces resulting in additional savings. Other features and advantages of the present invention will be readily understood from reading the following detailed description, when considered in conjunction with the accompanying drawings.

DETAILED DESCRIPTION

Figure 1:
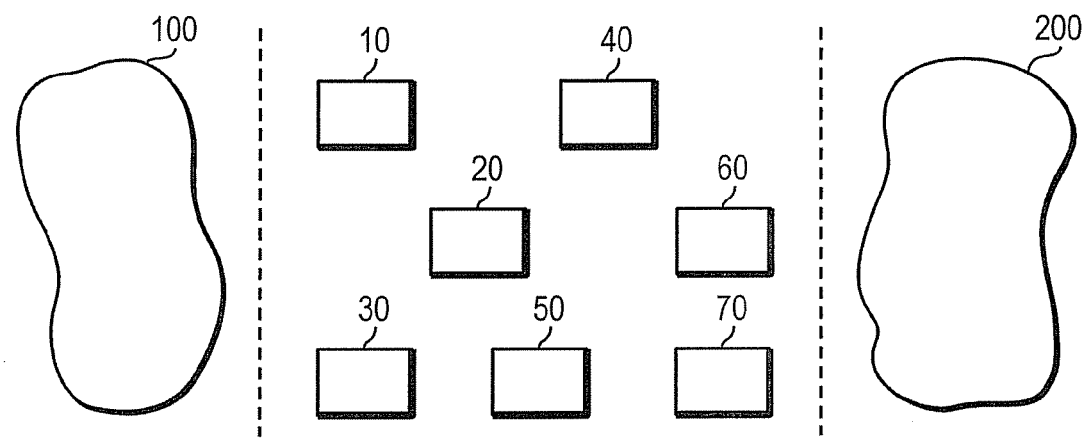
FIG. 1 illustrates a network of routers in accordance with the present invention.

Directing attention to FIG. 1, there is shown an exemplary network of routers in accordance with the present invention. Routers 10-70 function to pass traffic in the form of packetized data between points 100, 200. Points 100, 200 can be individual, end user computer systems, local area networks, wider area networks, and may even be separate computer networks containing additional routers, but in each case data packets are sent through at least some of the routers 10-70 between points 100, 200. While FIG. 1 illustrates a network having a specific number of routers 10-70, it is to be understood that various configurations of routers can be implemented in accordance with the present invention. Such variations include the number of routers included, as well as the communication medium employed between the routers. Routers 10-70 can communicate with each other over wireless media as well as wired media, as can points 100, 200.

Figure 2:
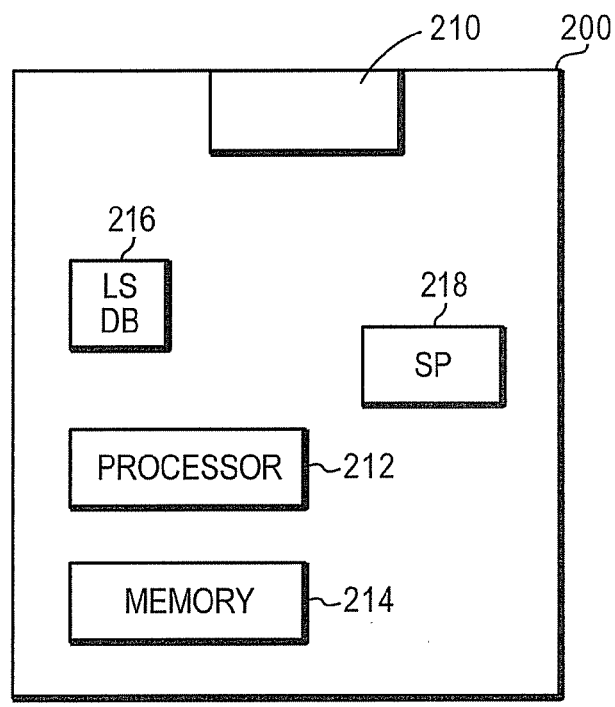
FIG. 2 illustrates in block diagram form the major components of a router in accordance with the present invention.

FIG. 2 illustrates an exemplary embodiment of routers 10-70. Router 200 includes communication connection 210, processor 212, memory 214, link state database 216, and shortest path data structure 218. Other components, commonly found in routers known to those skilled in the art, are included in router 200, but are not illustrated.

Figure 3:
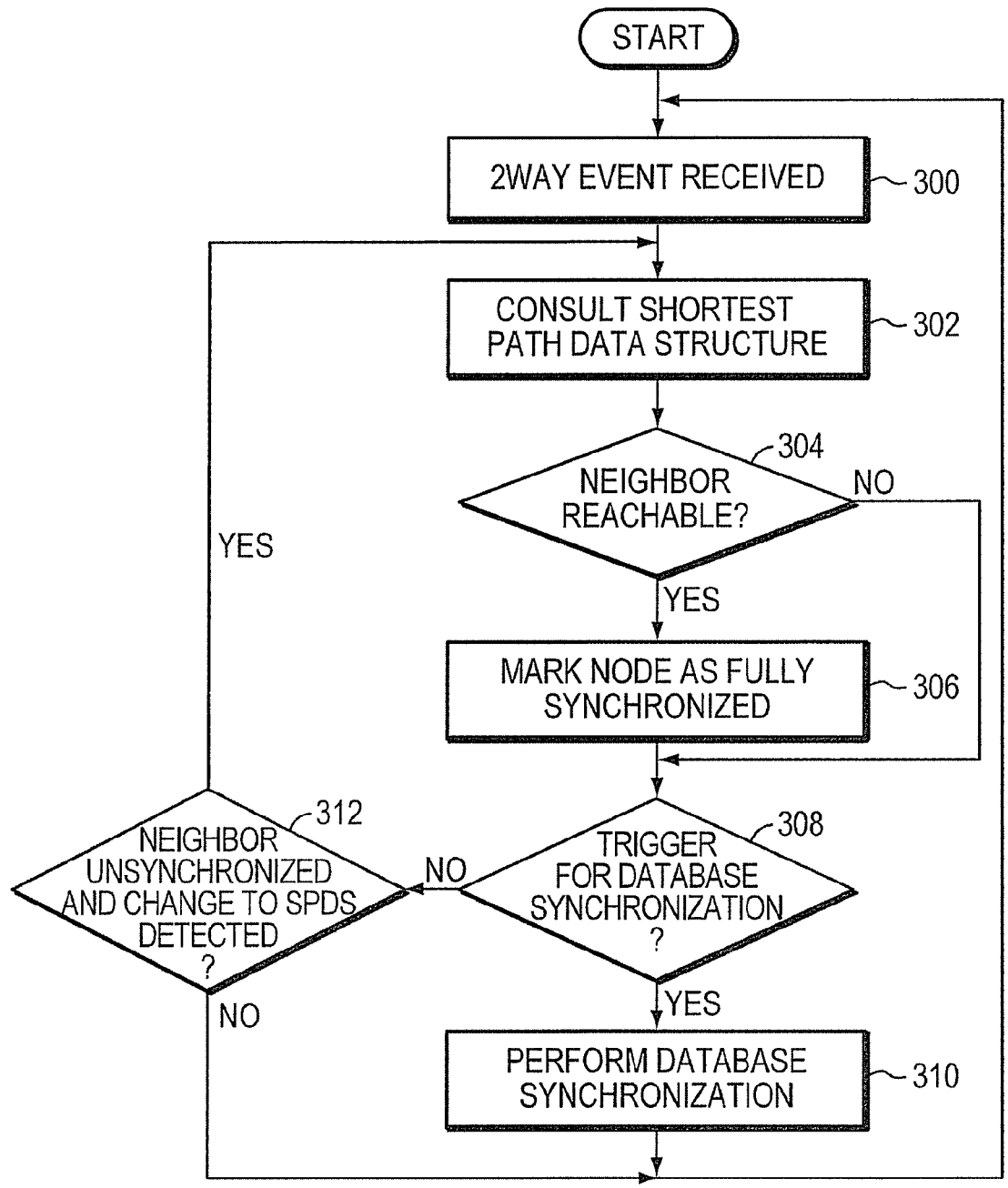
FIG. 3 illustrates in flow chart form a sequence of acts performed in accordance in an embodiment of the present invention.

FIG. 3 describes acts that are performed when a node has reached a 2-way state through exchanging hello messages with neighboring nodes that are detected. A node's shortest path data structure 218 includes link state advertisements that include an indicator of whether the node referenced in the link state advertisement has been advertised before its database 216 has been synchronized with the local node or is a part of a new adjacency awaiting database synchronization with the local node.

When a 2-WayReceived event has occurred (act 300), shortest path data structure 218 is consulted (act 302) to determine if the neighboring node that participated in the 2-WayReceived event is reachable (decision act 304). If yes, then based on the last SPF algorithm executed, the neighboring node is considered reachable. The link state advertisement corresponding to the neighboring node is designated in shortest path data structure 218 as full (act 306) to indicate that the neighboring node is fully synchronized. This means that the router-LSA or network-LSA link corresponding to the neighboring node is advertised as if the neighboring node is full. If there is no link state advertisement in shortest path data structure 218, then the neighboring node is considered unreachable by the paths designated in shortest path data structure 218.

In an embodiment, adjacency information is reflected in link state advertisements contained in shortest path data structure 218. At decision act 308, database synchronization is postponed—either by a configured amount of time, as in one embodiment, or until the time that an event triggers its occurrence. In either case, if database synchronization is currently pending, it is started as soon as a determination is made that the neighboring node is no longer reachable in the shortest path data structure (act 310). Database synchronization can be done by out-of-band synchronization [OOB], which maintains the current adjacency and performs database synchronization in the background. In standard-compliant OSPF environments, first adjacency is established, and then one or more transit links are announced. Embodiments of the present invention allow the link to be used as a forwarding path very quickly, and still allows the database to be synchronized in a timely fashion if the alternate flooding path has recently been broken.

In an embodiment, the present invention resolves a circular dependency issue existing between routers. Once the link is announced, the shortest path will likely be via this announced link. It is non-trivial to detect the corresponding alternate dependent path is gone, so consultation of the shortest path data structure determines whether the neighboring node is reachable via a path that doesn't traverse this unsynchronized link.

One solution is to run an SPF algorithm, such as Dijkstra's Algorithm, and ignore the existence of the link in question. It doesn't require a full execution of an SPF algorithm, but just enough to determine if any other path is available to reach the neighboring node. The worst-case scenario is when the alternate path is really gone, discovered by building a full shortest path first data structure 218, which is performed every time link state database 216 changes, and for each link which has shortest-path-first dependence for its viability.

The present invention achieves the same results by executing a single, additional shortest path first algorithm that is capable of ignoring these "unsynchronized" links. By constructing shortest path data structure 218 in this manner, it can be used to satisfy the reachability condition for any number of unsynchronized adjacencies. This basically requires that a difference can be recognized between a normal full adjacency and this new unsynchronized adjacency. This can be accomplished by two ways.

Figure 4:
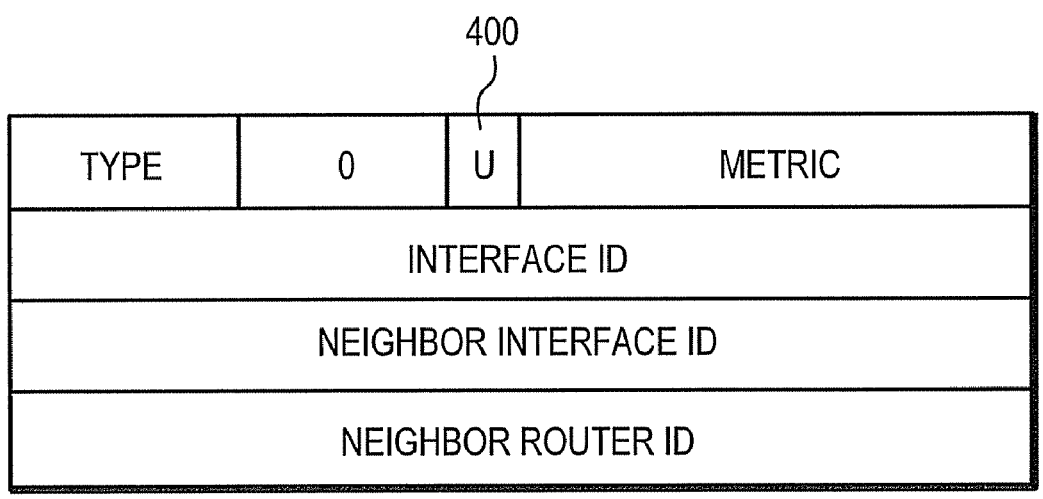
FIG. 4 illustrates an exemplary format for a link description included in a link state advertisement.

First, in the preferred embodiment, and indicator such as a bit in a link description, is shown in FIG. 4. U-bit 400 is an "unsynchronized bit." U-bit 400 is set if the adjacency is being announced before databases are fully synchronized. This approach is backward-compatible because the only routers looking at this bit are those that support the mechanisms specified in this document, and other routers ignore the value of this indicator.

In another embodiment, a new link type is included in a router's LSA. This is a much more complex solution, with backward-compatibility risks, since unknown link type handling is not defined in current OSPF standard [OSPF].

As described above, whenever link state changes occur, a single, additional SPF algorithm is executed that ignores all links with U-bit 400 set to indicate an unsynchronized database. The resulting shortest path data structure 218 is then consulted to see if any of the unsynchronized adjacencies require a database synchronization. Shortest path data structure 218 is also consulted when a new neighbor goes into a 2-way state to determine if the database exchange should be executed immediately or deferred until a later time. For unsynchronized neighboring nodes that remain in 2-way state with the local node, OSPF updates will not be flooded over the corresponding interfaces, thus reducing traffic over the network and improving communication efficiency.

While a method and apparatus for managing network communication with unsynchronized adjacencies has been described and illustrated in detail, it is to be understood that many modifications can be made to various embodiments of the present invention without departing from the spirit thereof.

What is claimed is:

1. A method of establishing an adjacency between a local node and a neighboring node in a communication network, wherein a link state database maintained by the local node and at least one link state database maintained by the neighboring node are initially unsynchronized, the method comprising:
    establishing two-way communication with the neighboring node in the communication network;
    consulting a shortest path data structure to determine whether the neighboring node is already reachable;
    if the neighboring node is already reachable according to the shortest path data structure, then despite the link state database maintained by the local node and the at least one link state database maintained by the neighboring node being unsynchronized, and without first synchronizing the link state database maintained by the local node with the at least one link state database maintained by the neighboring node, indicating that the neighboring node is fully synchronized with respect to link state advertisement for the adjacency;
    delaying link state database synchronization with the neighboring node, after the neighboring node is indicated as fully synchronized, until a database trigger is recognized; and
    synchronizing the link state database maintained by the local node with the at least one link state database maintained by the neighboring node, after the database trigger is recognized.

2. The method of claim 1, wherein the link state database synchronization is performed in a background mode.

3. The method of claim 1, wherein the database trigger comprises determining that a communication path no longer exists in the shortest path data structure.

4. The method of claim 1 wherein the shortest path data structure is constructed by ignoring one or more nodes with link states that indicate they are unsynchronized with respect to the link state database maintained by the local node.

5. The method of claim 4, further comprising updating the shortest path data structure by identifying nodes that are unsynchronized with respect to the link state database maintained by the local node.

6. A computer readable non-transitory storage medium containing instructions which, when executed by a data processor, establish an adjacency with a neighboring node by:
  establishing two-way communication with the neighboring node in a communication network;
  consulting a shortest path data structure to determine whether the neighboring node is already reachable;
  if the neighboring node is already reachable according to the shortest path data structure, then despite a link state database maintained by the local node and at least one link state database maintained by the neighboring node being unsynchronized, and without first synchronizing the link state database maintained by a local node with the at least one link state database maintained by the neighboring node, indicating that the neighboring node is fully synchronized with respect to link state advertisement for the adjacency;
  delaying link state database synchronization with the neighboring node, after the neighboring node is indicated as fully synchronized, until a database trigger is recognized; and
  synchronizing the link state database maintained by the local node with the at least one link state database maintained by the neighboring node, after the database trigger is recognized.

7. An apparatus for use in a communication network, comprising:
  a network communication connection;
  a processor;
  a memory;
  a local link state database containing link state information for neighboring nodes in the communication network; and
  a shortest path data structure, the shortest path data structure indicating shortest paths between the neighboring nodes in the communication network, one or more of the neighboring nodes in the communication network represented as fully synchronized with respect to link state advertisement for an adjacency, despite a link state database maintained at the one or more neighboring nodes being unsynchronized with the local link state database, and without first synchronizing the local link state database with the link state database maintained at the one or more neighboring nodes;
  the processor configured to synchronize the local link state database with the link state database maintained at the one or more neighboring nodes after a delay.

8. The method of claim 1, further comprising:
  storing Open Shortest Path First (OSPF) link state advertisements.

9. The method of claim 8, further comprising using as an indicator expressive of whether a represented node is synchronized or unsynchronized an unsynchronized bit (U-bit) in a link description of each link state advertisement.

10. The method of claim 8, further comprising using as an indicator expressive of whether a represented node is synchronized or unsynchronized a link type included in each link state advertisement.

11. The method of claim 1, wherein the establishing two-way communication with a neighboring node comprises:
  entering a 2-way state through exchange of hello messages with the neighboring node.

12. The computer readable medium of claim 6 further containing instructions which, when executed by the data processor, manage communication with neighboring nodes by:
  executing a shortest path first algorithm that ignores nodes with link states that indicate they are unsynchronized with respect to the link state database maintained by the local node.

13. The computer readable medium of claim 6, wherein the instructions which, when executed by the data processor, manage the communication with the neighboring node, further comprise instructions for storing Open Shortest Path First (OSPF) link state advertisements.

14. The computer readable medium of claim 13, wherein the instructions which, when executed by the data processor, manage the communication with the neighboring node, further comprise instructions for using as an indicator expressive of whether a represented node is synchronized or unsynchronized an unsynchronized bit (U-bit) in a link description of each link state advertisement.

15. The computer readable medium of claim 13, wherein the instructions which, when executed by the data processor, manage the communication with the neighboring node, further comprise instructions for using as an indicator expressive of whether a represented node is synchronized or unsynchronized a link type included in each link state advertisement.

16. The computer readable medium of claim 6, wherein the instructions which, when executed by the data processor, manage communication with the neighboring nodes by establishing the two-way communication with the neighboring node further comprise instructions for:
  entering a 2-way state through exchange of hello messages with the neighboring node.

17. The apparatus of claim 7, wherein the delay is for a configured amount of time.

18. The apparatus of claim 7, wherein the delay is until a trigger is recognized.

19. The apparatus of claim 7, wherein the one or more neighboring nodes are marked with an indicator expressing that the local link state database and the nodes are unsynchronized, and
  the processor is further configured to execute a shortest path first algorithm that ignores nodes associated with the indicator expressing that the local link state database and nodes are unsynchronized.

20. The apparatus of claim 7, wherein the processor is further configured to include an indicator in a link state advertisement, the indicator expressive of whether a link state database of a neighboring node is synchronized or unsynchronized with the local link state database.

* * * * *